United States Patent [19]
Jennings et al.

[11] Patent Number: 5,839,078
[45] Date of Patent: Nov. 17, 1998

[54] WASTE PROCESSING METHOD AND APPARATUS

[75] Inventors: Howard T. Jennings, Warrington; Lin Li, Manchester, both of United Kingdom

[73] Assignee: British Nuclear Fuels PLC, Warrington, United Kingdom

[21] Appl. No.: 793,275
[22] PCT Filed: Jul. 2, 1996
[86] PCT No.: PCT/GB96/01582
  § 371 Date: Mar. 5, 1997
  § 102(e) Date: Mar. 5, 1997
[87] PCT Pub. No.: WO97/05630
  PCT Pub. Date: Feb. 13, 1997

[30] Foreign Application Priority Data

Jul. 26, 1995 [GB] United Kingdom ............... 9515299

[51] Int. Cl.⁶ ........................................... G21F 9/00
[52] U.S. Cl. ........................ 588/11; 588/18; 588/252; 204/157.4; 422/159; 422/186.3
[58] Field of Search ............... 588/18, 11, 252; 204/157.4; 422/159, 186.3

[56] References Cited

U.S. PATENT DOCUMENTS 3,929,602  12/1975  Kaetsu et al. .
5,181,795  1/1993  Circeo, Jr. et al. ............. 405/128
5,342,582  8/1994  Horn et al. ...................... 422/105
5,417,825  5/1995  Graham et al. ................. 204/158.2
5,430,207  7/1995  Keck ................................ 585/241
5,439,595  8/1995  Downey, Jr. .................... 210/748

FOREIGN PATENT DOCUMENTS 0 647 598    4/1995  European Pat. Off. .
43 42 958    9/1994  Germany .
43 17 281 A1 3/1995  Germany .
A-8-59247    3/1996  Japan .
WO95/040004  2/1995  WIPO .

*Primary Examiner*—Ngoclan Mai
*Attorney, Agent, or Firm*—Oliff & Berridge, PLC

[57] ABSTRACT

A method and apparatus for treating toxic waste by the vitrification thereof are described, the method comprising the steps of providing said waste in the form of relatively small pieces; optionally adding vitrifiable material to said waste; bringing a high intensity light source to bear on said waste and said optional vitrifiable material; said high intensity light source being of sufficient power to cause melting and subsequent vitrification of said waste; and, cooling and storing said vitrified material.

23 Claims, 2 Drawing Sheets

WASTE PROCESSING METHOD AND APPARATUS

The present invention relates to a method and apparatus for processing waste materials particularly, though not exclusively, nuclear and other toxic waste materials such as heavy metal containing wastes.

The chemical industry in particular generates large volumes of toxic waste. The nuclear industry in comparison generates far lower volumes of waste but regulations demand even more rigorous treatment of such waste. The waste may be in the form of high level waste or low level waste. All of the waste produced by direct contamination with radio nuclides must either be stored or be processed in some manner to make it safe for storage for long periods of time. One of the methods for treating high level waste is that of vitrification into glass blocks. However, this method, practised by current methods has its own disadvantages in that yet further nuclear waste in the form of crucibles which are consumed during the melting operation is generated and which has to be dealt with. The current process is very effective in treating the waste but is very costly due to the fact that it is a chemical process carried out on highly radioactive material.

Other techniques for containing waste include encapsulation in concrete, and compaction and storage of low level waste such as tools, gloves and clothes for example.

A large proportion of the waste generated is during decommissioning of nuclear installations, such decommissioning becoming increasingly prevalent as nuclear power stations, for example, near the end of their useful lives. Therefore, it is a requirement throughout the world to find a vitrification process which does not produce or at least minimises the generation of so-called secondary waste (i.e. additional waste produced as a result of processing the primary nuclear waste).

It is an object of the present invention to provide a process for the direct vitrification of nuclear waste whilst minimising or eliminating the production secondary waste.

According to a first aspect of the present invention, there is provided a method of treating toxic waste by the vitrification thereof, the method comprising the steps of providing said waste in the form of relatively small pieces; bringing a high intensity light source to bear on said waste and said optional vitrifiable material; said high intensity light source being of sufficient power to cause melting and subsequent vitrification of said waste's and, cooling and storing said vitrified material.

Preferably, said high intensity light source comprises a broad band spectrum of frequencies.

Preferably, said broad band spectrum comprises continuous white light.

Preferably, said high intensity light source comprises a high intensity arc lamp. Such arc lamps are currently available in powers of up to 300 kW continuous optical power and in power densities of up to 2000 W/cm$^2$.

Arc lamps have particular advantages in that they can be focused or defocused so as to control the power density applied and that the light brought to bear on the waste is spread over a relatively much greater area than, for example, a laser beam.

Further advantages of arc lamps include the fact that they are much more efficient at about 50' energy utilisation compared to 1% energy utilisation for lasers. The capital cost of arc lamps is much lower and they are more compact and much less cumbersome in ancillary equipment required for their operation.

Yet further advantages of arc lamps relate to the nature of the light employed in that white light contains a large proportion of ultra violet light (uv) which is a high energy, low heat light form particularly useful in breaking up potentially dangerous and toxic organic molecules into less harmful molecules due to the action of uv light on the chemical bonds. Therefore, white light generated for arc lamp melting of waste may be particularly useful for dealing with so-called mixed wastes containing such potentially harmful toxic organic chemicals. White light also comprises a significant proportion of infra red light (ir) which is a relatively high heat component of whites light.

The method of the present invention is preferably carrier out in a closed chamber so as to contain all potentially harmful materials. The chamber may be provided with all necessary supplies of, for example, process gases, fluids for cooling, electrical control systems and any other desirable supplies.

The method of the present invention may be used to produce vitrified waste directly from the primary waste by use of arc lamp melting. Where the waste material does not naturally form a vitrified solid on cooling, such as metallic or organic waste for example, additional vitrifiable material such as concrete, sand, alumina for example, may be added to the waste to produce a vitrified binder in which the waste is held or encapsulated.

Some waste materials such as concrete are naturally vitrifiable and may not need further material thereto.

The method may be used to generate a bulk solid vitrified waste in a built up form, layer by layer or by continuously feeding a melt pool, contained within a steel drum for example. Waste may be introduced in the form of a continuous stream into a drum into which an arc lamp beam is directed, the drum and beam being moved relative to each other in a predetermined pattern so as to melt directly waste as it is introduced into the drum. Once the drum has reached a predetermined level of waste the process may be stopped and the drum cooled and sealed for storage. Refinements such as providing a relatively pure "skin" of vitrified material such as silica sand around the contaminated material by control of the material input and positioning of the drum and beam relative to each other may also be employed.

In an alternative embodiment of the method of the present invention, vitrified beads may be produced. Committed waste with the optional addition of vitrifiable material is introduced into a processing chamber which is provided with, for example, fluidised bed means, the waste being maintained in suspension by the fluidised bed means said simultaneously heated by a high intensity light source such that the waste is melted and vitrified into bead form. The heat source may be switched on and off for predetermined periods so that the vitrified beads may cool and solidify during off periods and allow them to be removed from the chamber and placed in suitable storage means.

Alternatively, such a method for the production of vitrified beads may be a semi-continuous process in that the beads become heavier with increase in heating time due to agglomeration of molten beads causing them to drop through the fluidised bed to a predetermined level where they can be automatically removed as part of a semicontinuous process.

According to a second aspect of the present invention there is provided apparatus for treating toxic waste by the vitrification thereof, the apparatus comprising a sealable process chamber; means for bringing a high intensity light source to bear on said waste in said chamber; said high intensity light source being of sufficient power to cause melting and subsequent vitrification of said waste; and, means to contain said waste within said chamber.

The high intensity light source is preferably a white light arc lamp.

The process chamber may be provided with an oxygen supply so as to create an oxidising atmosphere during processing, or may alternatively be provided with a reducing atmosphere such as by providing a hydrogen supply for example. The atmosphere may be determined by the materials being processed and their particular requirements.

BRIEF DESCRIPTION OF THE DRAWINGS

In order that the present invention may be more fully understood, examples will now be described by way of illustration only with reference to the accompanying drawings, of which.

Figure 1:
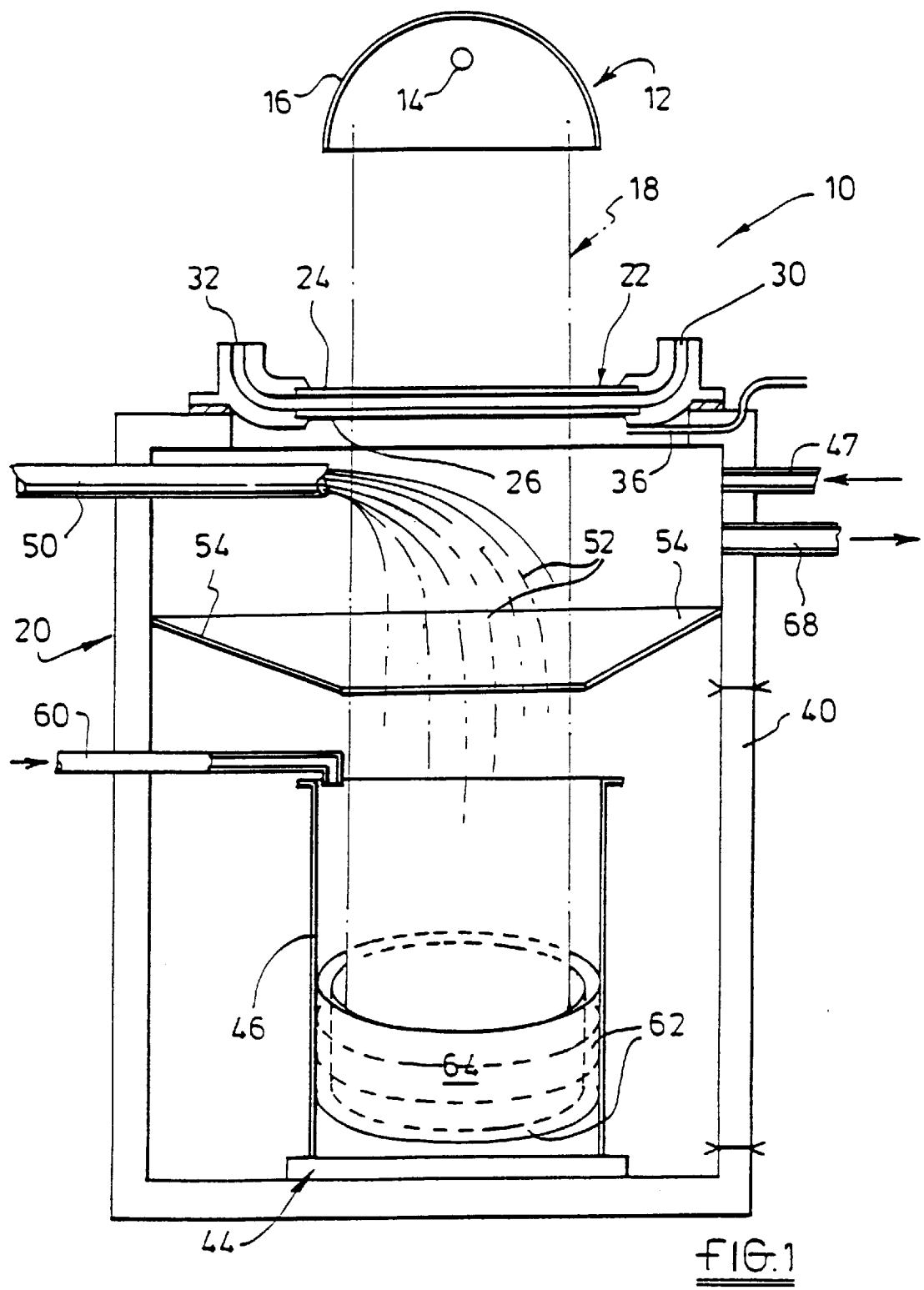
FIG. 1 shows a schematic view of an apparatus for carrying out one embodiment of the method of the present invention.

Referring now to the drawings and where the same or similar features are denoted by common reference numerals.

FIG. 1 shows a side view of a schematic apparatus, shown generally at 10, for carrying out a first embodiment of the method of the present invention. The apparatus comprises an arc lamp source 12 having a linear arc lamp tube 14 and a reflector 16 so as to create a substantially parallel sided, high intensity light beam 18. However by control of the positioning of the tube 14 relative to the reflector 16, the beam 18 may be focused or defocused as required to control power density at the target. The beam 18 passes into a process chamber 20 through a window 22 having twin translucent walls 24, 26 between which cooling fluid such as water, for example, flows, the entry and exit being provided by manifold junctions 30, 32. The window may comprise low absorbtion optical glass such as fused silica or quartz for example A supply 36 of inert gas is provided in the chamber 20 and is arranged to blow across the interior surface of the window 22 to suppress loss of optical quality due to fume and particulate condensation.

Alternatively or in addition, an electrostatic field may be used to repel particulates from the window 22. The chamber 20 is sealed to prevent egress of toxic material but is provided with door means 40 to allow access to the interior between process runs. At the base of the chamber 20 is a traversing mechanism shown generally at 44 to allow the controlled lateral movement, including rotation, of a stainless steel collector vessel 46 placed thereon. A conduit 50 positioned towards the top of the chamber 20 supplies comminuted waste 52 (indicated as dashed lines) into the chamber such that the waste falls through the beam 18 towards the vessel 46. Downwardly sloped baffle plates 54 are provided to ensure that all waste 50 falls into the vessel 46. A further conduit 60 is provided to supply uncontaminated material such as silica sand or alumina for example to the vessel 46. Other conduits, indicated generally by the single conduit 47, may be provided of supply any desired process gas depending upon the nature of the waste being treated. For example, inert gas carbon dioxide, oxygen or hydrogen may be supplied to make the atmosphere within the chamber 20 inert, oxidising or reducing. Reduced pressure atmospheres may also be employed. A conduit 68 may be provided in the chamber well to provide means for gaseous products to be removed during processing, the conduit being connected to pump and filter means (not shown).

In operation, the method of use of the apparatus described above is as follows. Uncontaminated material such as sand is introduced into the vessel 46 from the conduit 60 over the bottom of the vessel and around the periphery. The vessel is moved by the traversing/rotation table 44 such that the sand is heated and melted by the beam 18 to provide a vitrified layer 62 across the bottom and around the side of the vessel 46 to a desired thickness. The waste 52 such as comminuted contaminated concrete, is introduced into the vessel 46 through the conduit 50. The waste falls through the beam 18 and is heated thereby as it falls into the bottom of the vessel 46 where it melts and vitrifies 64 due to the action of the beam 18 and also due to conduction from the previously melted sand 62 in the vessel. Thus, the level of the vitrified material is increased in the vessel until a desired level is reached, both uncontaminated material and waste being added sequentially to provide the vitrified waste 64 contained within an outer shell of relatively pure vitrified material 62, the final material being uncontaminated material to form a relatively uncontaminated layer over the top. Once the vessel 46 and its contents have cooled sufficiently, it may be removed from the chamber 20 and a lid (not shown) welded on the top.

Figure 2:
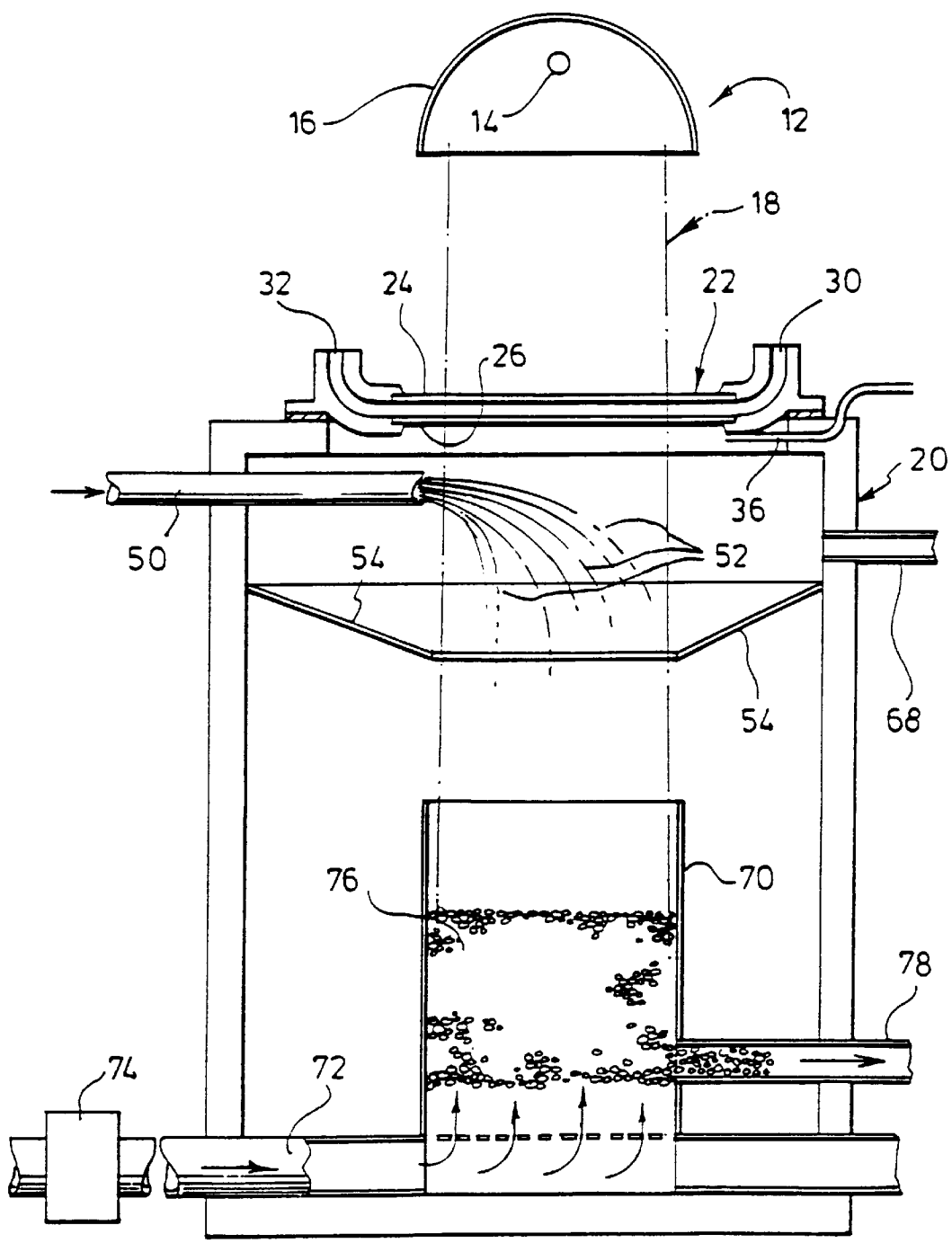
FIG. 2 which shows a schematic view of an apparatus for carrying out a second embodiment of the method of the present invention.

FIG. 2 shows a schematic side view of an apparatus for carrying out a second embodiment of the method of the present invention. The apparatus comprises a closed process chamber 20 having a fluidised bed 70 in the bottom thereof. Other features such as the inclusion of an arc lamp 1.2, translucent window 22 and other general features are as shown with reference to FIG. 1. Waste material 52 is again introduced via the conduit 50 which falls into the fluidised bed and is maintained in suspension by the gas flow indicated by the arrows 72. The chamber 20 is also provided with the appropriate pumps, indicated schematically at 74, to create gas circulation needed due to the fluidised bed 70. As the comminuted waste material 52 is maintained in suspension, it is heated by the beam 18 and caused to melt into beads 76 and agglomerate with adjacent molten beads. As the size of the beads 70 increases due to agglomeration, they fall though the bed 713 to a point where they are drawn off by a conduit 78 for collection and storage. Part of the beam 18 may be diverted to preheat the incoming gas flow 72 so as to heat the waste 52 partially by the fluidised bed gases.

Therefore, by the method of the present invention, contaminated waste may be directly vitrified as either bulk solid material or as beads without the consequent contamination and creation of substantial quantities of secondary waste as in known processes.

Furthermore, the use of high intensity arc lamps as a heat source is more efficient and cost effective than with known high intensity light sources such as lasers, the provision of a white light source having many consequential benefits.

We claim:

1. A method of treating toxic waste by the vitrification thereof, the method comprising the steps of providing said waste in the form of relatively small pieces; bringing a high intensity light source to bear on said waste and optional vitrifiable material; said high intensity light source being of sufficient power to cause melting and subsequent vitrification of said waste; and, cooling and storing said vitrified material.

2. A method according to claim 1 wherein the high intensity light source comprises a broad band spectrum of frequencies.

3. A method according to claim 2 wherein said broad band spectrum comprises continuous white light.

4. A method according to claim 1 wherein said high intensity light source comprises a high intensity arc lamp.

5. A method according to claim 1 wherein the method is carried out in a closed chamber.

6. A method according to claim 1 wherein said optional vitrifiable material is added to the waste to produce a vitrified binder.

7. A method according to claim 1 wherein the vitrified waste is in the form of a bulk solid.

8. A method according to claim 1 wherein the vitrified waste is in the form of vitrified beads.

9. A method according to claim 1 wherein said waste is heated in a continuous stream.

10. A method according to claim 1 wherein said waste is fed into a receiving vessel and vitrified therein.

11. A method according to claim 8 wherein said waste is suspended by fluidised bed means whilst being heated by said light source so as to produce vitrified beads.

12. Apparatus for treating toxic waste by the vitrification thereof, the apparatus comprising a sealable process chamber; means for bringing a high intensity light: source to bear on said waste in said chamber; said high intensity light source being of sufficient power to cause melting and subsequent vitrification of said waste; and, means to contain said waste within said chamber.

13. Apparatus according to claim 12 wherein said high intensity light source is a white light arc lamp.

14. Apparatus according to claim 12 wherein said means to contain said waste within said chamber is a metallic vessel.

15. Apparatus according to claim 12 further including moving means for moving said means for containing waste.

16. Apparatus according to claim 12 further including a coolable translucent window in said process chamber through which said high intensity light source is passed into said waste.

17. Apparatus according to claim 12 further including means for extracting gaseous products from said process chamber.

18. Apparatus according to claim 12 further including means for admitting gaseous material into said process chamber.

19. Apparatus according to claim 12 further including means to admit said waste in comminuted form into said process chamber.

20. Apparatus according to claim 12 further including means for admitting non-toxic vitrifiable material into said process chamber.

21. Apparatus according to claim 16 further including means for flowing a gas across the translucent window inside the process chamber.

22. Apparatus according to claim 12 further including pump means to provide a reduced pressure or an increased pressure atmosphere within said chamber.

23. Apparatus according to claim 12, further including means to fluidise said waste when in the form of particles whilst said fluidised waste is heated by said high intensity light source.

* * * * *